(12) United States Patent
Johnson et al.

(10) Patent No.: US 11,903,541 B2
(45) Date of Patent: Feb. 20, 2024

(54) AUTONOMOUS FLOOR CLEANER WITH DRIVE WHEEL ASSEMBLY

(71) Applicant: BISSELL Inc., Grand Rapids, MI (US)

(72) Inventors: Steven M. Johnson, Hudsonville, MI (US); Todd R. VanTongeren, Ada, MI (US); Matthew Haverkamp, Kentwood, MI (US)

(73) Assignee: BISSELL Inc., Grand Rapids, MI (US)

( * ) Notice: Subject to any disclaimer, the term of this patent is extended or adjusted under 35 U.S.C. 154(b) by 0 days.

(21) Appl. No.: 18/083,944

(22) Filed: Dec. 19, 2022

(65) Prior Publication Data

US 2023/0121949 A1 Apr. 20, 2023

Related U.S. Application Data

(62) Division of application No. 16/833,733, filed on Mar. 30, 2020, now Pat. No. 11,559,182.

(60) Provisional application No. 62/838,437, filed on Apr. 25, 2019.

(51) Int. Cl.
*A47L 11/40* (2006.01)
*B60B 37/04* (2006.01)

(52) U.S. Cl.
CPC ....... *A47L 11/4072* (2013.01); *A47L 11/4011* (2013.01); *A47L 11/4061* (2013.01); *B60B 37/04* (2013.01); *A47L 2201/02* (2013.01)

(58) Field of Classification Search
CPC .............. A47L 11/4072; A47L 11/4011; A47L 11/4061; A47L 2201/02; A47L 11/4005; A47L 11/4016; A47L 11/4041; A47L 11/4083; A47L 11/4088; A47L 2201/04; A47L 2201/06; B60B 37/04

USPC ................................ 15/3; 301/118, 119, 121
See application file for complete search history.

(56) References Cited

U.S. PATENT DOCUMENTS

| | | | |
|---|---|---|---|
| 5,716,107 | A | 2/1998 | Parker et al. |
| 5,960,514 | A | 10/1999 | Miller et al. |
| 5,974,622 | A | 11/1999 | Louis et al. |
| 5,995,884 | A | 11/1999 | Allen et al. |
| 6,282,747 | B1 | 9/2001 | Morgan et al. |
| 6,578,931 | B1 | 6/2003 | Anderson |
| 8,438,695 | B2 | 5/2013 | Gilbert, Jr. et al. |
| 8,950,038 | B2 | 2/2015 | Won et al. |
| 9,724,964 | B2 | 8/2017 | Morris et al. |

(Continued)

FOREIGN PATENT DOCUMENTS

| | | | |
|---|---|---|---|
| AU | 2018102050 A4 * | 1/2019 | ............ A47L 11/185 |
| AU | 2018251811 | 6/2019 | |
| EP | 2912982 | 6/2017 | |

*Primary Examiner* — B M M Hannan
(74) *Attorney, Agent, or Firm* — Warner Norcross + Judd LLP

(57) ABSTRACT

An autonomous floor cleaner can include a housing, a drive system for autonomously moving the housing over the surface to be cleaned, and a controller for controlling the operation of the autonomous floor cleaner. The drive system can include at least one drive wheel for driving the housing across a surface to be cleaned. The drive wheel can be selectively moved from an engaged or in-use position to a disengaged or maintenance position. In the disengaged or maintenance position, the wheel is disengaged from the autonomously moveable housing such that it can be pivoted, extended, removed, or otherwise moved farther away from the autonomously moveable housing.

17 Claims, 11 Drawing Sheets

(56) References Cited

U.S. PATENT DOCUMENTS

| | | |
|---|---|---|
| 9,950,565 B2 | 4/2018 | Pomp |
| 2004/0049878 A1 | 3/2004 | Thomas et al. |
| 2008/0066257 A1 | 3/2008 | Sun et al. |
| 2009/0139116 A1 | 6/2009 | Noonan et al. |
| 2012/0074663 A1 | 3/2012 | Parker et al. |
| 2013/0200583 A1 | 8/2013 | Morris et al. |
| 2015/0069821 A1 | 3/2015 | Bennett et al. |
| 2015/0128996 A1* | 5/2015 | Dooley .............. A47L 11/4083 15/98 |
| 2016/0137151 A1 | 5/2016 | Bull |
| 2016/0324384 A1* | 11/2016 | Dooley .............. A47L 11/4061 |
| 2017/0290722 A1 | 10/2017 | Thompson |
| 2018/0022168 A1 | 1/2018 | Dunning et al. |
| 2018/0170124 A1 | 6/2018 | Dodu et al. |
| 2018/0184875 A1 | 7/2018 | Youk et al. |
| 2018/0206686 A1 | 7/2018 | Shigeto et al. |
| 2019/0001745 A1 | 1/2019 | Delfino et al. |
| 2019/0191952 A1* | 6/2019 | Johnson .............. A47L 11/4011 |
| 2019/0210409 A1 | 7/2019 | Grace |
| 2019/0381840 A1 | 12/2019 | Hennig et al. |
| 2021/0001665 A1 | 1/2021 | Funato |

\* cited by examiner

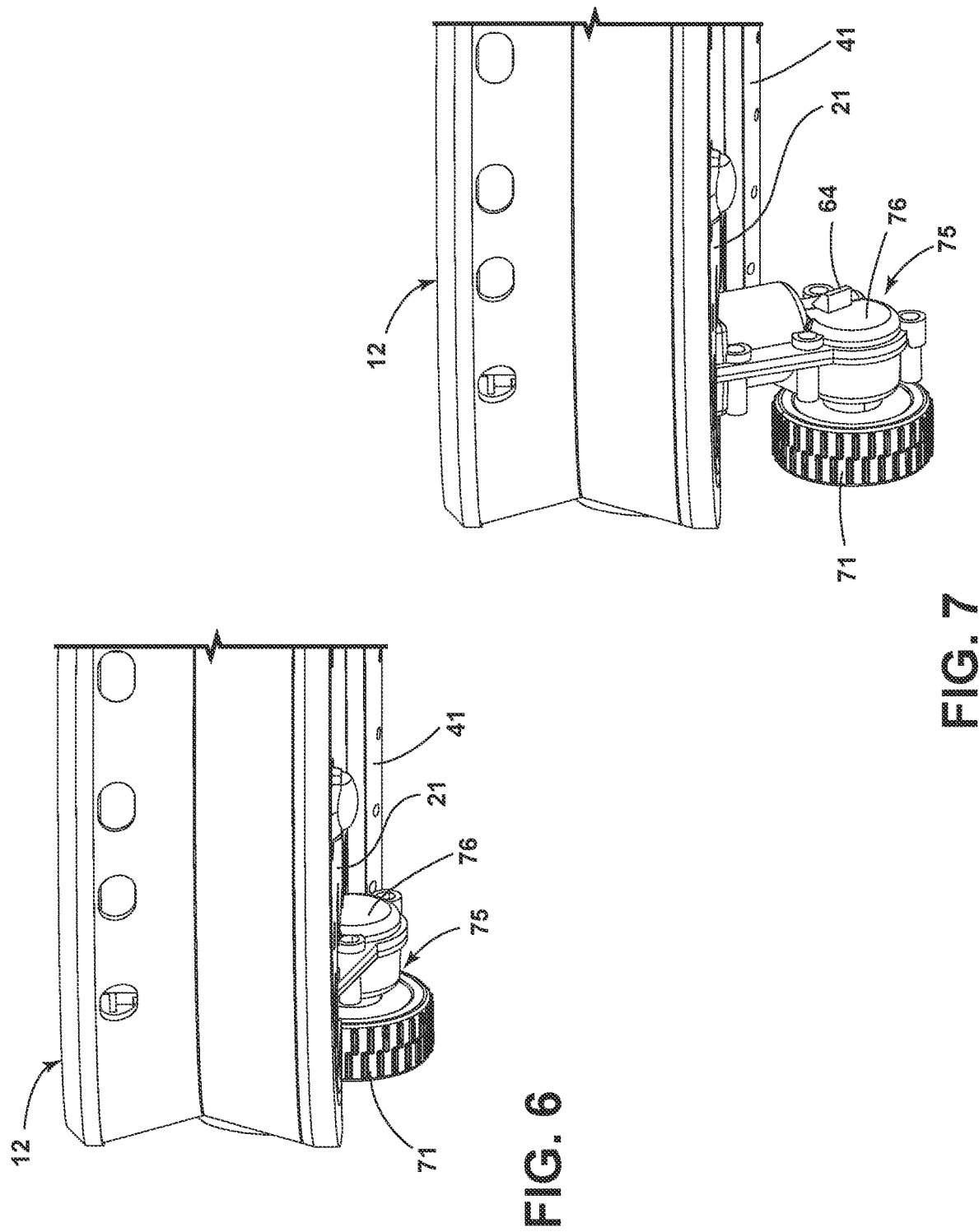

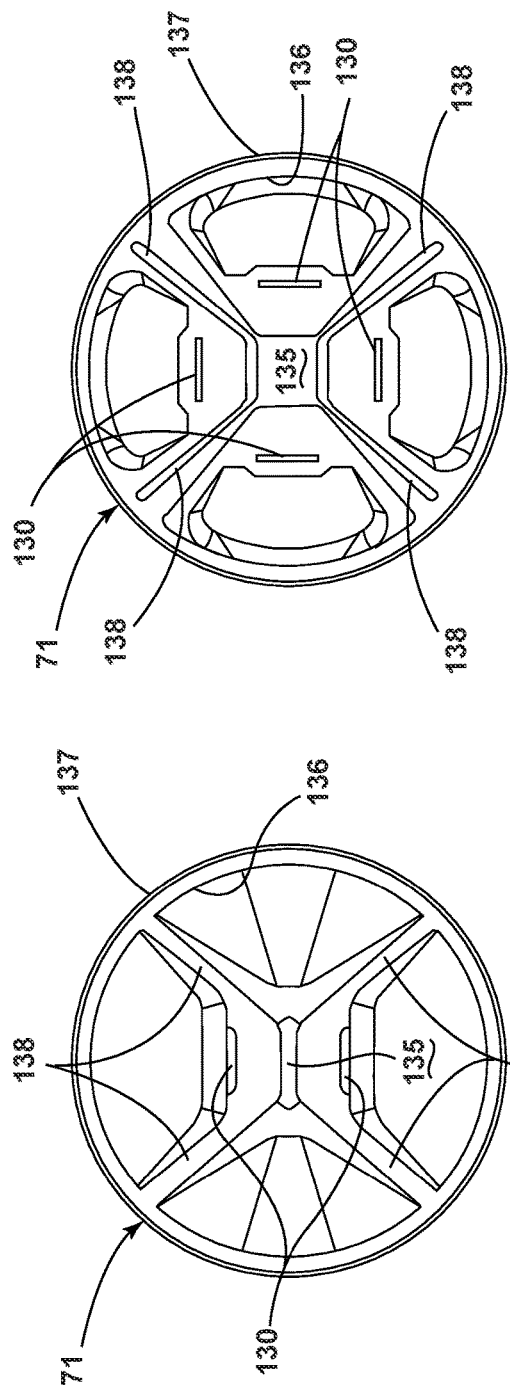
FIG. 14
FIG. 15
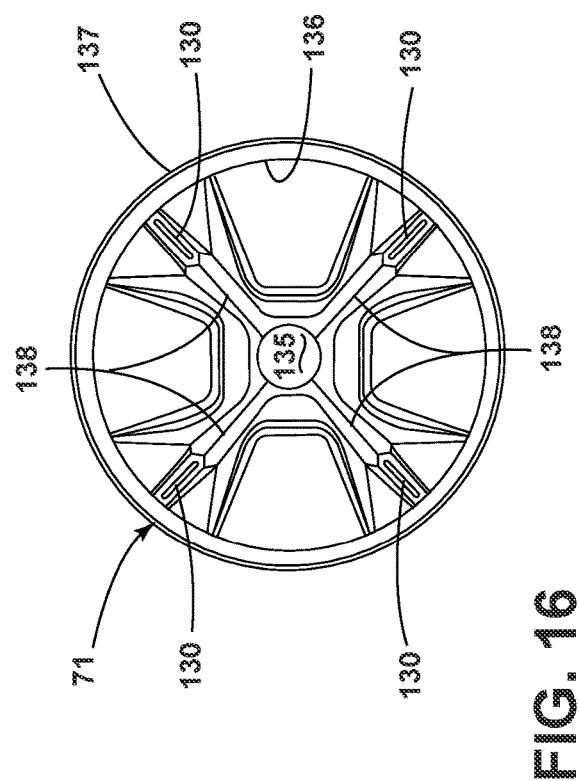
FIG. 16

AUTONOMOUS FLOOR CLEANER WITH DRIVE WHEEL ASSEMBLY

CROSS-REFERENCE TO RELATED APPLICATION(S)

This application is a divisional of U.S. patent application Ser. No. 16/833,733, filed Mar. 30, 2020, which claims the benefit of U.S. Provisional Patent Application No. 62/838,437, filed Apr. 25, 2019, both of which are incorporated herein by reference in their entirety.

BACKGROUND

Autonomous or robotic floor cleaners can move without the assistance of a user or operator to clean a floor surface. For example, the floor cleaner can be configured to vacuum or sweep dirt (including dust, hair, and other debris) into a collection bin carried on the floor cleaner. The floor cleaner can move randomly about a surface while cleaning the floor surface or use a mapping/navigation system for guided navigation about the surface. Some floor cleaners are further configured to apply and extract liquid for wet cleaning of bare floors, carpets, rugs, and other floor surfaces.

Such floor cleaners include a drive system with one or more drive wheels for driving the floor cleaner across a surface to be cleaned. Hair and other dirt tend to become caught around the drive wheels, and over time can build up and prevent the drive wheels from functioning properly. A user must manually remove the buildup around the drive wheels, which is time consuming and undesirable. With wet cleaning robots, this problem is compounded by the hair and debris being wet, which makes the buildup harder to remove.

BRIEF SUMMARY

In one aspect, the disclosure relates to an autonomous floor cleaner. The autonomous floor cleaner includes an autonomously moveable housing, a drive system for autonomously moving the housing over the surface to be cleaned, and a controller for controlling the operation of the autonomous floor cleaner.

The drive system can include at least one drive wheel for driving the housing across a surface to be cleaned. The drive wheel can be operated by a wheel motor.

The drive wheel can be selectively moved from an engaged or in-use position to a disengaged or maintenance position. In the engaged or in-use position, the wheel is engaged with the autonomously moveable housing for an autonomous cleaning operation of the robot. In the disengaged or maintenance position, the wheel is disengaged from the autonomously moveable housing such that it can be pivoted, extended, removed, or otherwise moved farther away from the autonomously moveable housing. In this way, the drive wheel can be cleaned, removed or otherwise serviced in the disengaged or maintenance position.

The drive system can receive inputs from the controller for driving the robot across a floor, based on inputs from a navigation/mapping system or based on inputs from a smartphone, tablet, or other remote device.

In one embodiment, the drive system includes a wheel assembly pivotally coupled to the housing for rotation about a pivot axis, the wheel assembly comprising a drive wheel and a wheel motor configured to drive the drive wheel about a rotational axis, wherein the wheel assembly is pivotable within a range of in-use positions, including at a maximum extension in-use position in which the drive wheel is fully extended from the housing, and a wheel release selectively releasing the wheel assembly from operational engagement with the housing, wherein when released from operational engagement with the housing, the drive wheel is pivotable to a disengaged position that is farther than in the maximum extension in-use position from the housing.

In certain embodiments, the drive wheel can be coupled to a wheel housing. The wheel housing can be rotatably coupled to the autonomously moveable housing.

In certain embodiments, the autonomous floor cleaner includes a vacuum collection or recovery system configured to generate a partial vacuum at the surface to be cleaned for removing liquid and debris from the surface to be cleaned. In alternative embodiments, the autonomous floor cleaner can include a sweeper-type collection system that mechanically collects dirt and liquid without the use of suction.

The recovery system can include a recovery pathway through the housing having an air inlet and an air outlet, a debris receptacle, bin, or recovery tank, and a suction source in fluid communication with the air inlet and the debris receptacle, bin, or recovery tank generating a working air stream through the recovery pathway.

In certain embodiments, the autonomous floor cleaner includes a fluid delivery system. The fluid delivery system can include a supply tank for storing a supply of cleaning fluid, at least one fluid distributor in fluid communication with the supply tank, and a fluid delivery pump configured to control a flow of the cleaning fluid to the at least one fluid distributor.

These and other features and advantages of the present disclosure will become apparent from the following description of particular embodiments, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

In the drawings:

FIG. 6 is an isometric view of the underside of the floor cleaning robot of FIG. 3, showing the wheel assembly in an engaged or in-use position;

FIG. 7 is a view similar to FIG. 6, showing the wheel assembly in a disengaged or maintenance position;

FIG. 14 is a side view of another embodiment of a removable drive wheel that can be utilized in the floor cleaning robot of FIG. 3;

FIG. 15 is a side view of yet another embodiment of a removable drive wheel that can be utilized in the floor cleaning robot of FIG. 3; and FIG. 16 is a side view of still another embodiment of a removable drive wheel that can be utilized in the floor cleaning robot of FIG. 3.

DETAILED DESCRIPTION

The disclosure generally relates to autonomous floor cleaners for cleaning floor surfaces, including bare floors such as hardwood, tile and stone, and soft surfaces such as carpets and rugs. More specifically, the disclosure relates to drive systems for autonomous floor cleaners.

Figure 1:
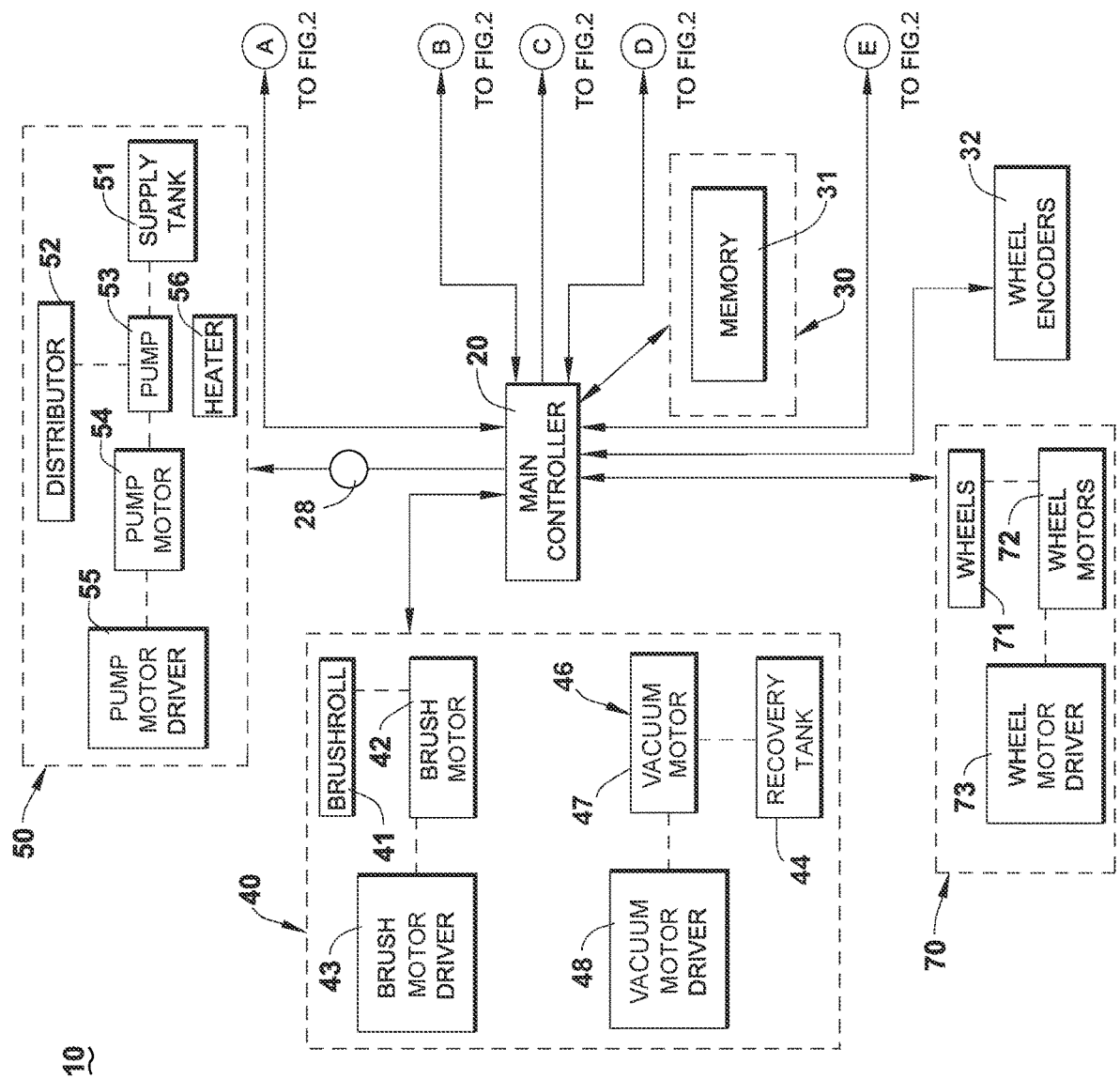
FIG. 1 is a schematic view of an exemplary autonomous floor cleaner illustrating functional systems in accordance with various aspects described herein.
Figure 2:
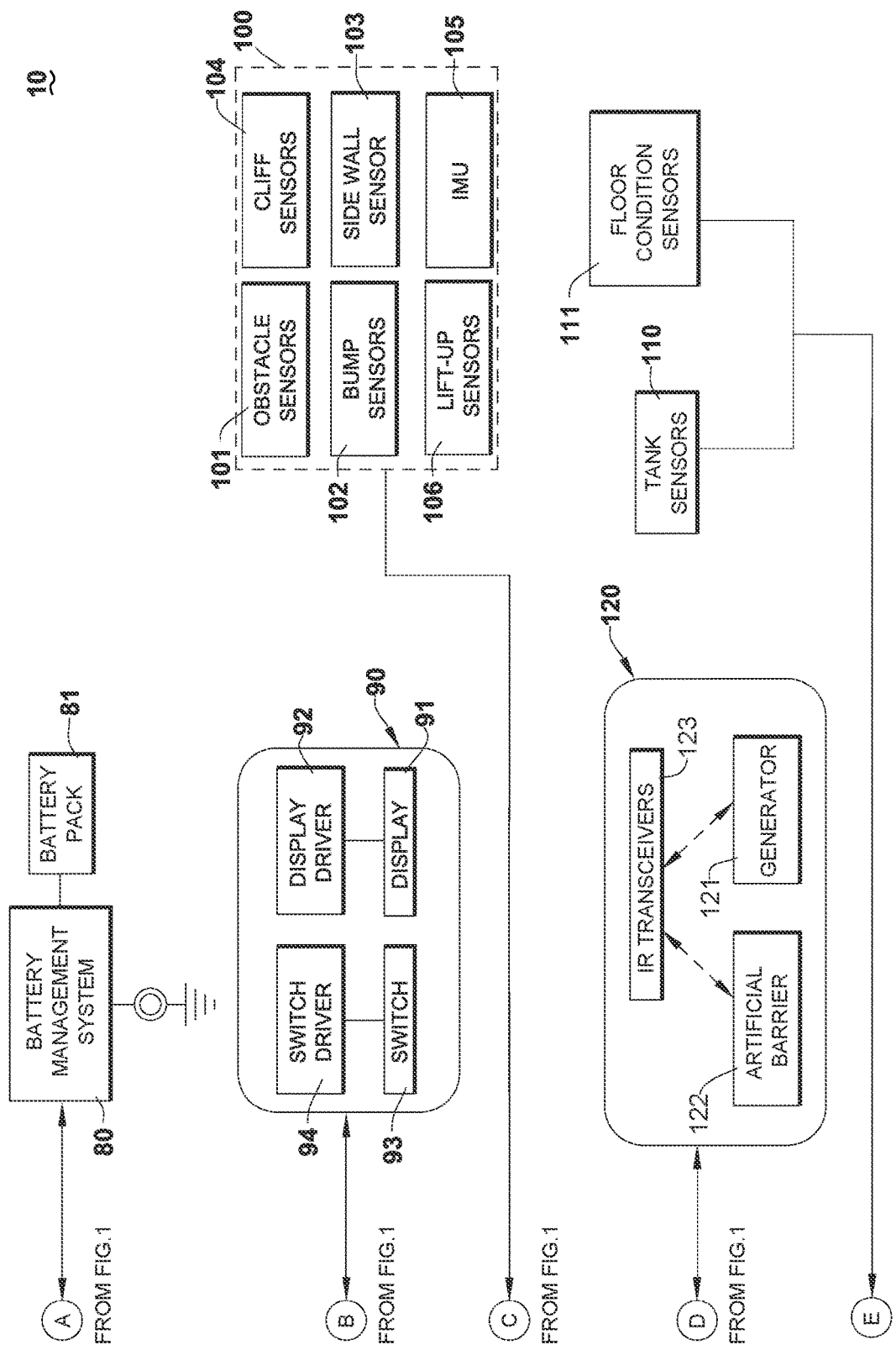
FIG. 2 is a schematic view of the autonomous floor cleaner of FIG. 1 illustrating additional functional systems in accordance with various aspects described herein.

FIGS. 1 and 2 illustrate a schematic view of an autonomous floor cleaner, such as a floor cleaning robot 10, also referred to herein as a robot 10. It is noted that the robot 10 shown is but one example of a floor cleaning robot configured to sweep as well as dust, mop or otherwise conduct a wet cleaning cycle of operation, and that other autonomous cleaners requiring fluid supply or fluid recovery are contemplated, including, but not limited to autonomous floor cleaners capable of delivering liquid, steam, mist, or vapor to the surface to be cleaned.

The robot 10 can include components of various functional systems in an autonomously moveable unit. The robot 10 can include a chassis or main housing 12 (FIG. 3) adapted to selectively mount components of the systems to form a unitary movable device. A controller 20 is operably coupled with the various functional systems of the robot 10 for controlling the operation of the robot 10. The controller 20 can be a microcontroller unit (MCU) that contains at least one central processing unit (CPU).

A navigation/mapping system 30 can be provided in the robot 10 for guiding the movement of the robot 10 over the surface to be cleaned, generating and storing maps of the surface to be cleaned, and recording status or other environmental variable information. The controller 20 can receive input from the navigation/mapping system 30 or from a remote device such as a smartphone (not shown) for directing the robot 10 over the surface to be cleaned. The navigation/mapping system 30 can include a memory 31 that can store any data useful for navigation, mapping or conducting a cycle of operation, including, but not limited to, maps for navigation, inputs from various sensors that are used to guide the movement of the robot 10, etc. For example, wheel encoders 32 can be placed on the drive shafts of wheels coupled to the robot 10 and configured to measure a distance traveled by the robot 10. The distance measurement can be provided as input to the controller 20.

In an autonomous mode of operation, the robot 10 can be configured to travel in any pattern useful for cleaning or sanitizing including boustrophedon or alternating rows (that is, the robot 10 travels from right-to-left and left-to-right on alternate rows), spiral trajectories, etc., while cleaning the floor surface, using input from various sensors to change direction or adjust its course as needed to avoid obstacles. In a manual mode of operation, movement of the robot 10 can be controlled using a mobile device such as a smartphone or tablet.

The robot 10 can also include at least the components of a vacuum collection or recovery system 40 for removing liquid and debris from the surface to be cleaned, a fluid delivery system 50 for storing cleaning fluid and delivering the cleaning fluid to the surface to be cleaned, and a drive system 70 for autonomously moving the robot 10 over the surface to be cleaned.

Alternatively, the collection system 40 can be configured as a sweeping or mechanical collection system that mechanically collects dirt and liquid without the use of suction, such as by the brushroll 41 mechanically propelling dirt and liquid directly into the recovery tank 44. In yet another alternative or additional collection mechanism, a mopping or dusting assembly can be provided for removing moistened dirt and other debris from the surface to be cleaned, and can include at least one stationary or rotatable cleaning pad.

The vacuum collection or recovery system 40 can include a recovery pathway through the housing 12 having an air inlet defined by a suction nozzle 45 (FIGS. 3-4) and an air outlet (not shown), a debris receptacle, bin, or recovery tank 44 for receiving recovered liquid and/or debris for later disposal, and a suction source 46 in fluid communication with the suction nozzle 45 and the recovery tank 44 for generating a working air stream through the recovery pathway. The suction source 46 can include a vacuum motor 47 located fluidly upstream of the air outlet, and can define a portion of the recovery pathway.

The suction nozzle 45 shown herein is positioned in close proximity to the brushroll 41 to collect liquid and debris directly from the brushroll 41. In other embodiments, the suction nozzle 45 can be positioned to confront the surface to be cleaned to remove liquid and debris from the surface, rather than the brushroll 41.

The recovery tank 44 can define a portion of the recovery pathway and can comprise a separator (not shown) for separating liquid and debris from the working airstream. Optionally, a pre-motor filter and/or a post-motor filter (not shown) can be provided in the recovery pathway as well. The recovery pathway can further include various conduits, ducts, or tubes for fluid communication between the various components of the vacuum collection system 40. The vacuum motor 47 can be positioned downstream of the recovery tank 44 in the recovery pathway. In other embodiments, the vacuum motor 47 may be located fluidly upstream of the recovery tank 44.

The vacuum collection or recovery system 40 can also include at least one agitator for agitating the surface to be cleaned. The agitator can be in the form of a brushroll 41 mounted for rotation about a substantially horizontal axis, relative to the surface over which the robot 10 moves. A drive assembly including a separate, dedicated brush motor 42 can be provided within the robot 10 to drive the brushroll 41. Other agitators or brushrolls can also be provided, including one or more stationary or non-moving brushes, or one or more brushes that rotate about a substantially vertical axis.

The fluid delivery system 50 can include a supply tank 51 for storing a supply of cleaning fluid and at least one fluid distributor 52 in fluid communication with the supply tank 51 for depositing a cleaning fluid onto the surface. The cleaning fluid can be a liquid such as water or a cleaning solution specifically formulated for hard or soft surface cleaning. The fluid distributor 52 can be one or more spray nozzles provided on the housing 12 with an orifice of sufficient size such that debris does not readily clog the nozzle. Alternatively, the fluid distributor 52 can be a manifold having multiple distributor outlets.

A pump 53 can be provided in the fluid pathway between the supply tank 51 and the at least one fluid distributor 52 to control the flow of fluid to the at least one fluid distributor 52. The pump 53 can be driven by a pump motor 54 to move liquid at any flowrate useful for a cleaning cycle of operation.

Various combinations of optional components can also be incorporated into the fluid delivery system 50, such as a heater 56 or one or more fluid control and mixing valves. The heater 56 can be configured, for example, to warm up the cleaning fluid before it is applied to the surface. In one embodiment, the heater 56 can be an in-line fluid heater between the supply tank 51 and the distributor 52. In another example, the heater 56 can be a steam generating assembly. The steam assembly is in fluid communication with the supply tank 51 such that some or all the liquid applied to the floor surface is heated to vapor.

The drive system 70 can include drive wheels 71 for driving the robot 10 across a surface to be cleaned. The drive wheels 71 can be operated by a common wheel motor 72 or individual wheel motors coupled with the drive wheels 71 by a transmission, which may include a gear train assembly or another suitable transmission. The drive system 70 can receive inputs from the controller 20 for driving the robot 10 across a floor, based on inputs from the navigation/mapping system 30 for the autonomous mode of operation or based on inputs from a smartphone, tablet, or other remote device for the manual mode of operation. The drive wheels 71 can be driven in a forward or reverse direction to move the unit forwardly or rearwardly. Furthermore, the drive wheels 71 can be operated simultaneously at the same rotational speed for linear motion or independently at different rotational speeds to turn the robot 10 in a desired direction.

The robot 10 can include any number of motors useful for performing locomotion and cleaning. In one example, four dedicated motors can be provided to rotate the brushroll 41, each of two drive wheels 71, and generate a partial vacuum at the suction nozzle 45. In another example, one shared motor can rotate the brushroll 41 and generate a partial vacuum at the suction nozzle 45, and a second and third motor can rotate each drive wheel 71. In still another example, one shared motor can rotate the brushroll 41 and generate a partial vacuum at the suction nozzle 45, and a second shared motor can rotate both drive wheels 71.

In addition, a brush motor driver 43, a vacuum motor driver 48, pump motor driver 55, and wheel motor driver 73 can be provided for controlling the brush motor 42, pump motor 54, and wheel motors 72, respectively. The motor drivers 43, 48, 55, 73 can act as an interface between the controller 20 and their respective motors 42, 47, 54, 72. The motor drivers 43, 48, 55, 73 can also be an integrated circuit chip (IC). It is also contemplated that a single wheel motor driver 73 can control multiple wheel motors 72 simultaneously.

Turning to FIG. 2, the motor drivers 43, 48, 55, 73 (FIG. 1) can be electrically coupled to a battery management system 80 that includes a built-in rechargeable battery or removable battery pack 81. In one example, the battery pack 81 can include lithium ion batteries. Charging contacts for the battery pack 81 can be provided on an exterior surface of the robot 10. A docking station (not shown) can be provided with corresponding charging contacts that can mate to the charging contacts on the exterior surface of the robot 10. The battery pack 81 can be selectively removable from the robot 10 such that it can be plugged into mains voltage via a DC transformer for replenishment of electrical power, i.e. charging. When inserted into the robot 10, the removable battery pack 81 can be at least partially located outside the housing 12 (FIG. 3) or completely enclosed in a compartment within the housing 12, in non-limiting examples and depending upon the implementation.

The controller 20 is further operably coupled with a user interface (UI) 90 on the robot 10 for receiving inputs from a user. The user interface 90 can be used to select an operation cycle for the robot 10 or otherwise control the operation of the robot 10. The user interface 90 can have a display 91, such as an LED display, for providing visual notifications to the user. A display driver 92 can be provided for controlling the display 91, and acts as an interface between the controller 20 and the display 91. The display driver 92 may be an IC. The robot 10 can further be provided with a speaker (not shown) for providing audible notifications to the user. The robot 10 can further be provided with one or more cameras or stereo cameras (not shown) for acquiring visible notifications from the user. In this way, the user can communicate instructions to the robot 10 by gestures. For example, the user can wave their hand in front of the camera to instruct the robot 10 to stop or move away. The user interface 90 can further have one or more switches 93 that are actuated by the user to provide input to the controller 20 to control the operation of various components of the robot 10. A switch driver 94 can be provided for controlling the switch 93, and acts as an interface between the controller 20 and the switch 93.

The controller 20 can further be operably coupled with various sensors for receiving input about the environment and can use the sensor input to control the operation of the robot 10. The sensors can detect features of the surrounding environment of the robot 10 including, but not limited to, walls, floors, chair legs, table legs, footstools, pets, consumers, and other obstacles. The sensor input can further be stored in the memory or used to develop maps for navigation. Some exemplary sensors are illustrated in FIG. 2, and described below. Although it is understood that not all sensors shown may be provided, additional sensors may be provided, and that all of the possible sensors can be provided in any combination.

The robot 10 can include a positioning or localization system 100. The localization system 100 can include one or more sensors, including but not limited to the sensors described above. In one non-limiting example, the localization system 100 can include obstacle sensors 101 determining the position of the robot 10, such as a stereo camera in a non-limiting example, for distance and position sensing. The obstacle sensors 101 can be mounted to the housing 12 (FIG. 3) of the robot 10, such as in the front of the housing 12 to determine the distance to obstacles in front of the robot 10. Input from the obstacle sensors 101 can be used to slow down or adjust the course of the robot 10 when objects are detected.

Figure 3:
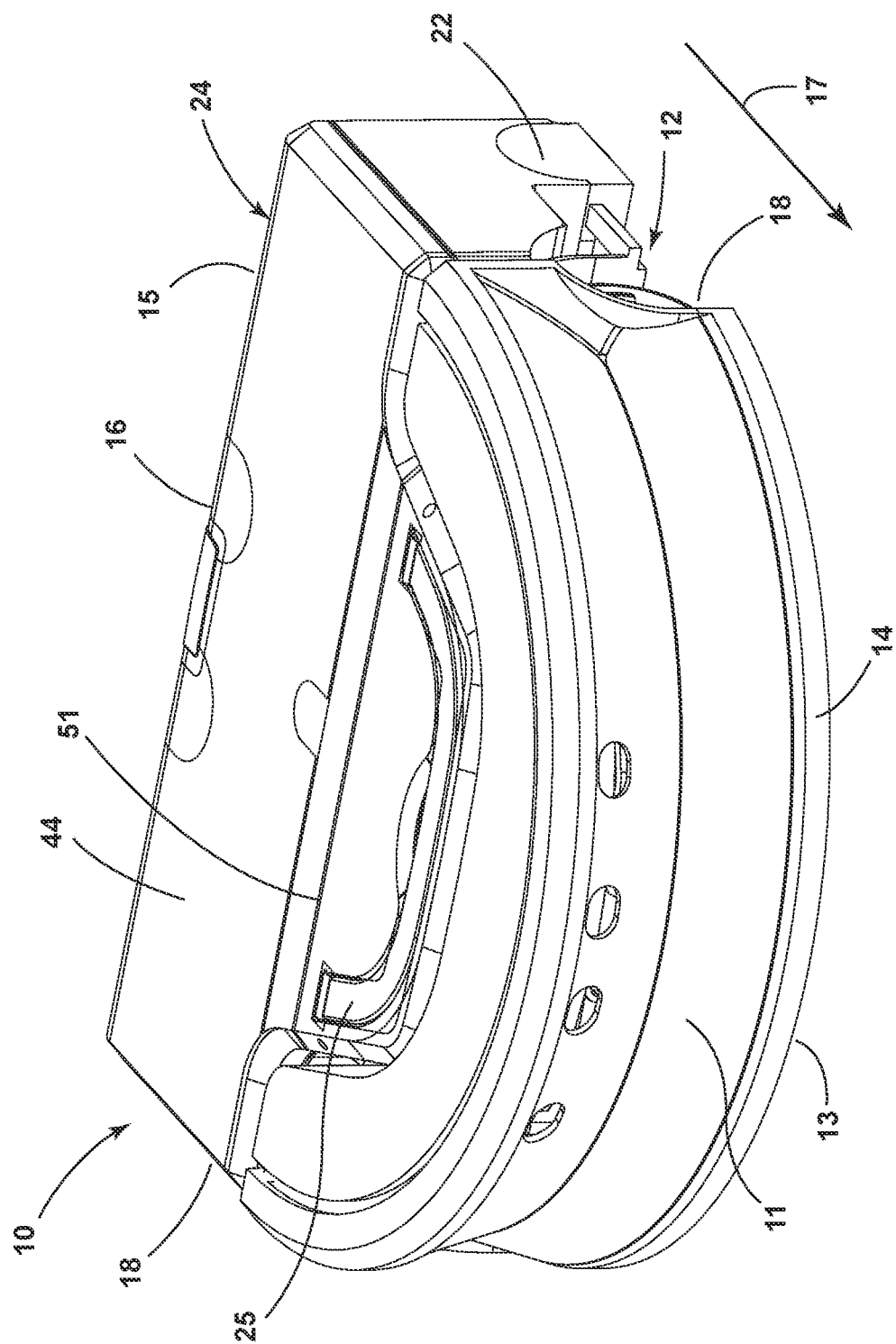
FIG. 3 is a front isometric view of the autonomous floor cleaner of FIG. 1 in the form of a floor cleaning robot in accordance with various aspects described herein.

Bump sensors 102 can also be provided in the localization system 100 for determining front or side impacts to the robot 10. The bump sensors 102 may be integrated with the housing 12, such as with a bumper 14 (FIG. 3). Output signals from the bump sensors 102 provide inputs to the controller for selecting an obstacle avoidance algorithm.

The localization system 100 can further include a side wall sensor 103 (also known as a wall following sensor) and a cliff sensor 104. The side wall sensor 103 or cliff sensor 104 can be optical, mechanical, or ultrasonic sensors, including reflective or time-of-flight sensors. The side wall sensor 103 can be located near the side of the housing 12 and can include a side-facing optical position sensor that provides distance feedback and controls the robot 10 so that the robot 10 can follow near a wall without contacting the wall. The cliff sensors 104 can be bottom-facing optical position sensors that provide distance feedback and control the robot 10 so that the robot 10 can avoid excessive drops down stairwells, ledges, etc.

The localization system 100 can also include an inertial measurement unit (IMU) 105 to measure and report the robot's acceleration, angular rate, or magnetic field surrounding the robot 10, using a combination of at least one accelerometer, gyroscope, and, optionally, magnetometer or compass. The inertial measurement unit 105 can be an integrated inertial sensor located on the controller 20 and can be a nine-axis gyroscope or accelerometer to sense linear, rotational or magnetic field acceleration. The IMU 105 can use acceleration input data to calculate and communicate change in velocity and pose to the controller 20 for navigating the robot 10 around the surface to be cleaned.

The localization system 100 can further include one or more lift-up sensors 106 which detect when the robot 10 is lifted off the surface to be cleaned e.g. if a user picks up the robot 10. This information is provided as an input to the controller 20, which can halt operation of the pump motor 54, brush motor 42, vacuum motor 47, or wheel motors 72 in response to a detected lift-up event. The lift-up sensors 106 may also detect when the robot 10 is in contact with the surface to be cleaned, such as when the user places the robot 10 back on the ground. Upon such input, the controller 20 may resume operation of the pump motor 54, brush motor 42, vacuum motor 47, or wheel motors 72.

The robot 10 can optionally include one or more tank sensors 110 for detecting a characteristic or status of the recovery tank 44 or supply tank 51. In one example, one or more pressure sensors for detecting the weight of the recovery tank 44 or supply tank 51 can be provided. In another example, one or more magnetic sensors for detecting the presence of the recovery tank 44 or supply tank 51 can be provided. This information is provided as an input to the controller 20, which may prevent operation of the robot 10 until the supply tank 51 is filled, the recovery tank 44 is emptied, or both are properly installed, in non-limiting examples. The controller 20 may also direct the display 91 to provide a notification to the user that either or both of the tanks 44, 51 is missing.

The robot 10 can further include one or more floor condition sensors 111 for detecting a condition of the surface to be cleaned. For example, the robot 10 can be provided with an infrared (IR) dirt sensor, a stain sensor, an odor sensor, or a wet mess sensor. The floor condition sensors 111 provide input to the controller that may direct operation of the robot 10 based on the condition of the surface to be cleaned, such as by selecting or modifying a cleaning cycle. Optionally, the floor condition sensors 111 can also provide input for display on a smartphone.

An artificial barrier system 120 can also be provided for containing the robot 10 within a user-determined boundary. The artificial barrier system 120 can include an artificial barrier generator 121 that comprises a barrier housing with at least one signal receiver for receiving a signal from the robot 10 and at least one IR transmitter for emitting an encoded IR beam towards a predetermined direction for a predetermined period of time. The artificial barrier generator 121 can be battery-powered by rechargeable or non-rechargeable batteries or directly plugged into mains power. In one non-limiting example, the receiver can comprise a microphone configured to sense a predetermined threshold sound level, which corresponds with the sound level emitted by the robot 10 when it is within a predetermined distance away from the artificial barrier generator. Optionally, the artificial barrier generator 121 can further comprise a plurality of IR emitters near the base of the barrier housing configured to emit a plurality of short field IR beams around the base of the barrier housing. The artificial barrier generator 121 can be configured to selectively emit one or more IR beams for a predetermined period of time, but only after the microphone senses the threshold sound level, which indicates the robot 10 is nearby. Thus, the artificial barrier generator 121 can conserve power by emitting IR beams only when the robot 10 is near the artificial barrier generator 121.

The robot 10 can have a plurality of IR transceivers (also referred to as "IR XCVRs") 123 around the perimeter of the robot 10 to sense the IR signals emitted from the artificial barrier generator 121 and output corresponding signals to the controller 20, which can adjust drive wheel control parameters to adjust the position of the robot 10 to avoid boundaries established by the artificial barrier encoded IR beam and the short field IR beams. Based on the received IR signals, the controller 20 prevents the robot 10 from crossing an artificial barrier 122 or colliding with the barrier housing. The IR transceivers 123 can also be used to guide the robot 10 toward the docking station, if provided.

In operation, sound (or light) emitted from the robot 10 greater than a predetermined threshold signal level is sensed by the microphone (or photodetector) and triggers the artificial barrier generator 121 to emit one or more encoded IR beams for a predetermined period of time. The IR transceivers 123 on the robot 10 sense the IR beams and output signals to the controller 20, which then manipulates the drive system 70 to adjust the position of the robot 10 to avoid the barriers 122 established by the artificial barrier system 120 while continuing to perform a cleaning operation on the surface to be cleaned.

The robot 10 can operate in one of a set of modes. The modes can include a wet mode, a dry mode and a sanitization mode. During a wet mode of operation, liquid from the supply tank 51 is applied to the floor surface and the brushroll 41 is rotated. During a dry mode of operation, the brushroll 41 is rotated and no liquid is applied to the floor surface. During a sanitizing mode of operation, liquid from the supply tank 51 is applied to the floor surface, the brushroll 41 is rotated, and the robot 10 can select a travel pattern such that the applied liquid remains on the surface of the floor for a predetermined length of time. The predetermined length of time can be any duration that will result in sanitizing floor surfaces including, but not limited to, two to five minutes. However, sanitizing can be effected with durations of less than two minutes and as low as fifteen seconds. During each of the wet mode, dry mode, and sanitization modes of operation, a partial vacuum can be generated at the suction nozzle 45 by the suction source 46 to collect liquid and/or debris in the recovery tank 44.

It is also contemplated that the pump 53 (FIG. 1) can be driven according to a pulse-width modulation (PWM) signal 28. Pulse-width modulation is a method of communication by generating a pulsing signal. Pulse-width modulation can be utilized for controlling the amplitude of digital signals in order to control devices and applications requiring power or electricity, such as the pump motor 54. The PWM signal 28 can control an amount of power given to the pump 53 by cycling the on-and-off phases of a digital signal at a predetermined frequency and by varying the width of an "on" phase. The width of the "on" phase is also known as duty cycle, which is expressed as the percentage of being "fully on" (100%). The pump 53 can essentially receive a steady power input with an average voltage value that is the result of the duty cycle and can be less than the maximum voltage capable of being delivered from the battery pack 81. The PWM signal 28 can be transmitted from the controller 20 and configured to provide a set flowrate of deposited cleaning fluid. In one non-limiting example of operation, the PWM signal 28 can cyclically energize the pump 53 for a first predetermined time duration, such as 40 milliseconds, and then de-energize the pump for a second predetermined time duration, such as 2 seconds, at a rate of 50 Hz and a duty cycle of 40%. Higher flow rates can be achieved by, for example, increasing either or both of the duty cycle or frequency. In this manner, the controller 20 can provide for any suitable or customized flow rate, including a low flow rate, from the pump 53 being powered from the battery pack 81.

Figure 4:
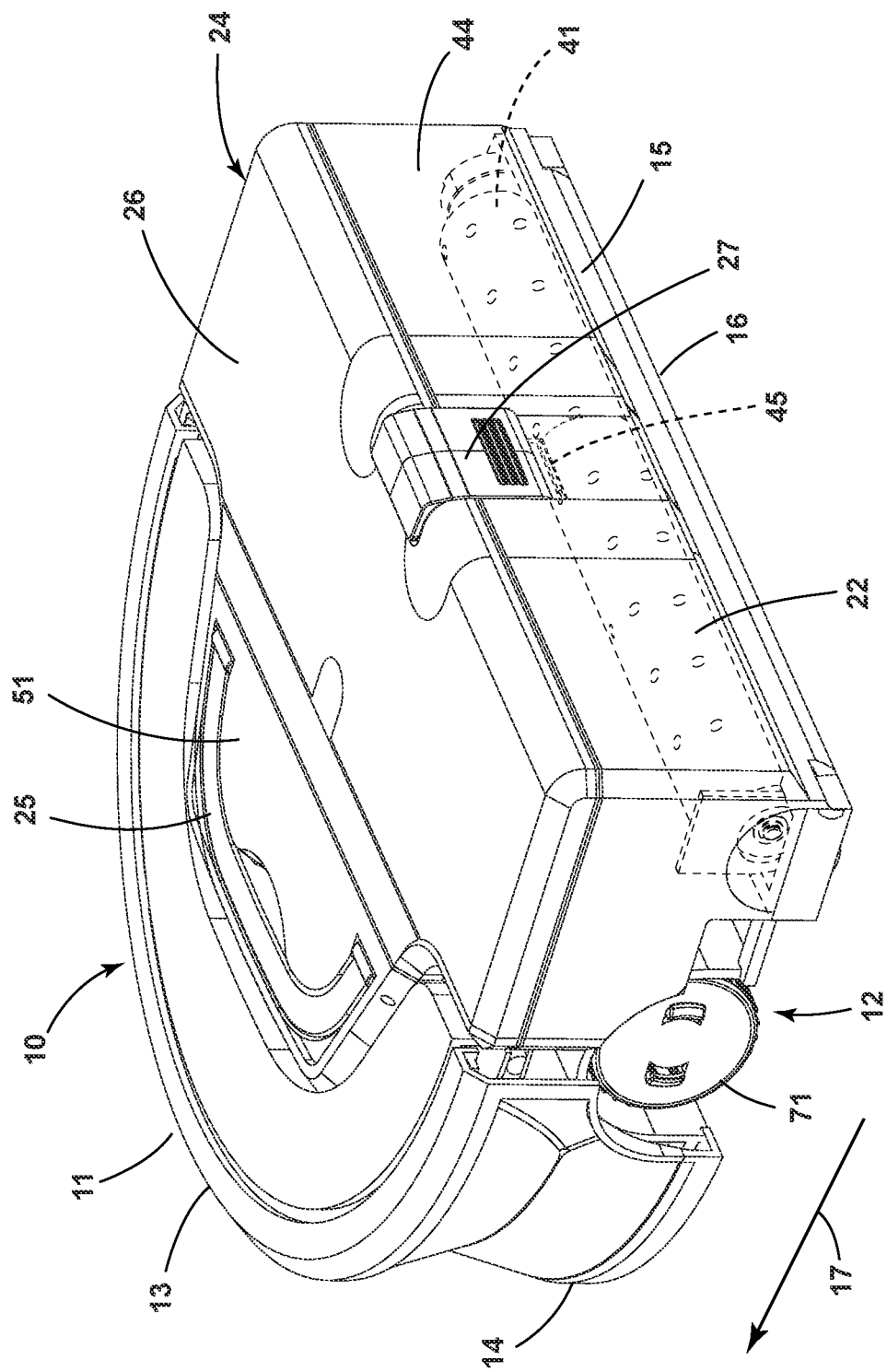
FIG. 4 is a rear isometric view of the floor cleaning robot of FIG. 3.

FIGS. 3-4 illustrate the exemplary robot 10 that can include the systems and functions described in FIGS. 1-2. As shown, the robot 10 can include a D-shaped housing 12 with a first end 13 and a second end 15. The first end 13 defines a housing front 11 of the robot 10 that is a rounded portion of the D-shaped housing 12, and can be formed by the bumper 14. The second end 15 can define a housing rear 16 that is a straightedge portion of the D-shaped housing 12. Other shapes and configurations for the robot 10 are possible, including that the rounded portion of the D-shaped housing 12 can define the housing front and the straightedge portion of the D-shaped housing 12 can define the housing rear.

Forward motion of the robot 10 is illustrated with an arrow 17, and the bumper 14 wraps around the first end 13 of the robot 10 to cover the housing front 11 of the robot 10. During a collision with an obstacle, the bumper 14 can shift or translate to register a detection of an object. The bumper 14 can also wrap around and cover a portion of each lateral side 18 of the robot 10. The lateral sides 18 of the robot extend between the first end 13 or housing front 11 of the robot 10 and the second end 15 or housing rear 16 of the robot 10.

A rear isometric view of the robot 10 is shown in FIG. 4. The robot 10 can include the brushroll 41 and at least one wheel assembly with a drive wheel 71. The brushroll 41 can be positioned within a brush chamber 22, which can define the suction nozzle 45. The brushroll 41 and brush chamber 22 can be located proximate the second end 15, e.g. proximate the straightedge portion of the housing 12. Along an underside 21 of the robot 10, the underside 21 facing the surface to be cleaned over which the robot 10 moves, and with respect to the direction of forward motion indicated by arrow 17, the brushroll 41 is mounted behind the drive wheels 71. In addition, the recovery tank 44 can be positioned adjacent the brushroll 41 and brush chamber 22. In the illustrated example, the recovery tank 44 is positioned above the brush chamber 22 and brushroll 41, and partially above the drive wheels 71. The supply tank 51 can be positioned rearwardly of the recovery tank 44, and also rearwardly of the brush chamber 22, brushroll 41, and drive wheels 71. Other configurations of the supply tank 51 are possible.

The recovery tank 44 and supply tank 51 can be at least partially formed from a translucent or transparent material, such that an interior space of the tanks 44, 51 is visible to the user. The brush chamber 22 can be at least partially formed from a translucent or transparent material, such that the use can view the brushroll 41.

The recovery tank 44 and supply tank 51 can be separate components on the housing 12. Alternately, the recovery tank 44 and supply tank 51 can be integrated into a single unitary or integrated tank assembly 24 as shown. It is contemplated that the tank assembly 24 can be selectively removed by a consumer such that both the recovery tank 44 and supply tank 51 are removed together in one action. The tank assembly 24 can be attached to the housing 12 using any suitable mechanism, including any suitable latch, catch, or other mechanical fastener that can join the tank assembly 24 and housing 12, while allowing for the regular separation of the tank assembly 24 from the housing 12. A handle 25 can be provided on the tank assembly 24, wherein a user can grasp the handle 25 to lift the tank assembly 24 from the housing 12.

It is further contemplated that the tank assembly 24 can at least partially, or fully, define the brush chamber 22 and suction nozzle 45, such that the brush chamber 22 and suction nozzle 45 are also removed upon removal of the tank assembly 24. This can improve usability and serviceability, wherein a consumer can remove the tank assembly 24 in a single action to empty and rinse out the recovery tank 44, clean the brush chamber 22 and suction nozzle 45, and fill the supply tank 51.

The recovery tank 44 can have an openable cover 26 to facilitate emptying the collected contents of the tank 44. A release button 27 or other actuator can optionally be provided for unlatching or detaching the cover 26 from the recovery tank 44. It is further contemplated that the supply tank 51 can be selectively removable from the recovery tank 44 when the tank assembly 24 is detached from the housing 12.

Figure 5:
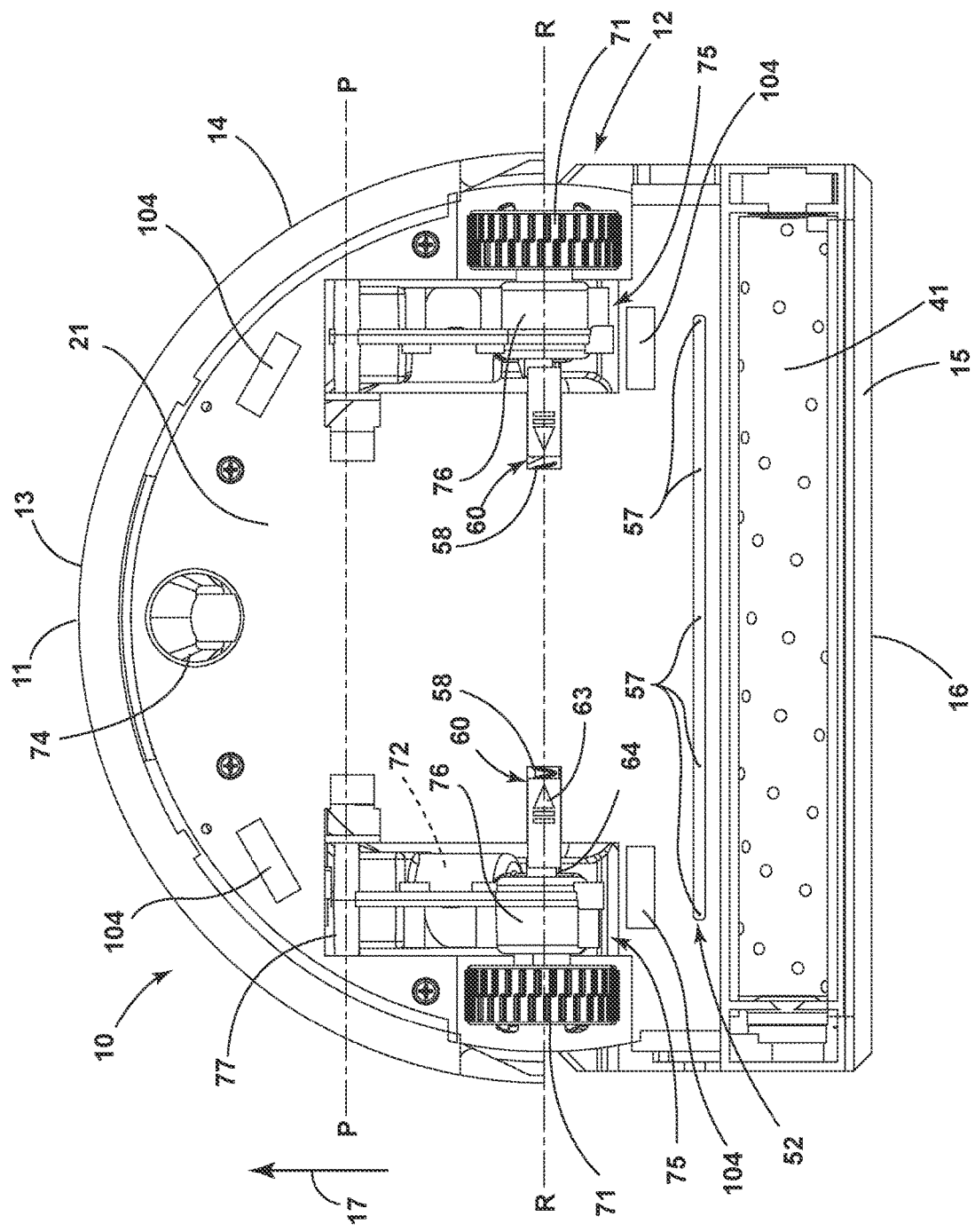
FIG. 5 is a bottom view of the floor cleaning robot of FIG. 3, showing one embodiment of a wheel assembly that can be utilized in the floor cleaning robot.

A bottom view of the robot 10 is shown in FIG. 5, where an underside 21 of the housing 12 is visible. In addition to the two drive wheels 71, the robot 10 can also include at least one caster 74 to maintain a minimum spacing between the surface to be cleaned and the underside portion 21 of the robot 10. The caster 74 can include a wheel mounted on an axle, or an omnidirectional ball for rolling in multiple directions, in non-limiting examples. The caster 74 can, in one example, be positioned proximate to the first end 13 or housing front 11.

In the example shown, the fluid distributor 52 includes a manifold fluidly coupled to the supply tank 51 (FIG. 4) via the pump 53 (FIG. 1). The manifold can have a plurality of outlets 57 positioned on the underside 21 of the robot 10 to deliver cleaning fluid directly to the floor surface. The outlets 57 can be positioned forwardly of the brushroll 41, and the brushroll 41 can distribute, absorb and remove the applied cleaning fluid from the floor surface, including during a wet mode of operation of the robot 10 as described above.

In another example (not shown), a squeegee can optionally be provided on the housing 12, such as behind the brushroll 41. In such a case, the squeegee can be configured to contact the surface as the robot 10 moves across the surface to be cleaned. The squeegee can wipe any remaining residual liquid from the surface to be cleaned, thereby leaving a moisture and streak-free finish on the surface to be cleaned. In a dry application, the squeegee can prevent loose debris from being scattered by the rotating brushroll 41.

The robot 10 shown includes two wheel assemblies 75 on opposing sides of the housing 12. Each wheel assembly 75 can include a wheel housing 76, one drive wheel 71 coupled to the wheel housing 76, and one wheel motor 72. The wheel motor 72 can be housed within the wheel housing 76 or can be housed within a separate motor housing that is formed with or otherwise coupled to the wheel housing 76. The wheel motor 72 is configured to drive the drive wheel 72 about a rotational axis R, relative to the wheel housing 76. As briefly described above, the wheel motor 72 can be drivingly coupled with the drive wheel 71 by a transmission, which may include a gear train assembly, or more specifically a worm gear assembly, or another suitable transmission. The transmission or gear train can be housed within the wheel housing 76, so the wheel housing 76 can further comprise a gearbox in some embodiments of the wheel assembly 75. The transmission or gear train can alternatively be housed within a separate gearbox that is formed with or otherwise coupled to the wheel housing 76.

The wheel assembly 75 is coupled to the housing 12 or a chassis of the robot 10, and can more particularly be rotatably coupled to the housing 12 or a chassis of the robot 10 to adjust to various floor surface contours or obstacles. In the embodiment shown, the wheel assembly 75 comprises a pivot coupling 77 rotatably mounted to the housing 12 for rotation of the wheel assembly 75 about a pivot axis P. During locomotion of the robot 10, if the drive wheels 71 traverse an obstacle such as a threshold or power cord or otherwise encounter a change in floor surface contour, the drive wheels 71 can partially rise into the housing 12 by rotation of the wheel housing 76 about the pivot axis P. The pivot coupling 77 can be provided on the wheel housing 76, or elsewhere on the wheel assembly 75.

The drive wheel assembly 75 can be selectively moved from an engaged or in-use position, an example of which is shown in FIG. 6, to a disengaged or maintenance position, an example of which is shown in FIG. 7. In the engaged or in-use position, the wheel assembly 75 is engaged with the housing 12. In the disengaged or maintenance position, the wheel assembly 75 is disengaged from the housing 12 such that it can be pivoted, extended, or otherwise moved farther away from the housing 12 than is possible in the engaged or in-use position. In this way, the drive wheel 71 can be cleaned, removed or otherwise serviced in the disengaged or maintenance position.

FIG. 6 shows the wheel assembly 75 in one example of the engaged or in-use position. In particular, FIG. 6 shows the wheel assembly 75 in a maximum extension engaged or in-use position. Because the wheel assembly 75 is rotatably mounted to the housing 12 to adjust to various surface contours, the wheel assembly 75 can pivot within a range of in-use positions while still being engaged with the housing 12. For example, the wheel assembly 75 can pivot between a minimum extension or retracted in-use position (FIG. 8) in which the drive wheel 71 is closest to the housing 12, and a maximum extension in-use position (FIG. 6) in which the drive wheel 71 is farthest from the housing 12. When the wheel assembly 75 is in the disengaged or maintenance position shown in FIG. 7, the drive wheel 71 can be pivoted, extended, or otherwise moved even farther away from the housing 12 than is possible in the maximum extension in-use position shown in FIG. 6. In the embodiment shown, the drive wheel 71 in particular pivots, extends, or moves relative to the underside 21 of the housing 12.

Figure 8:
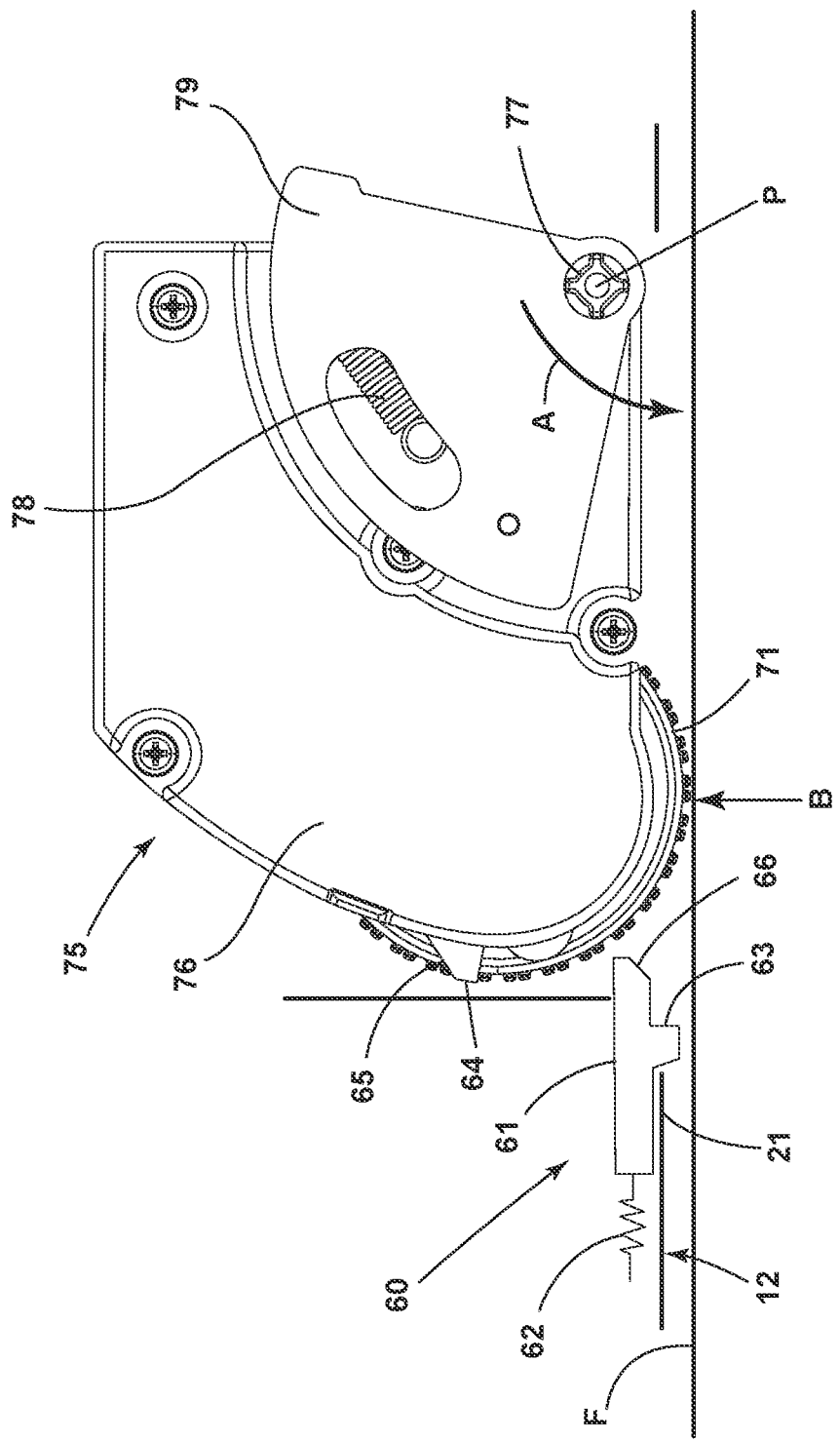
FIG. 8 is a schematic illustration of the wheel assembly.

FIG. 8 is a schematic illustration of the wheel assembly 75 of the robot 10. A spring 78 can bias the drive wheel 71 to the minimum extension in-use position or the maximum extension in-use position. In the embodiment shown, the spring 78 is a compression spring biasing the drive wheel 71 downwardly toward the surface to be cleaned, or counterclockwise about the pivot axis P with respect to the view shown in FIG. 8 as indicated by arrow A, toward the maximum extension in-use position, an example of which is shown in FIG. 6. In FIG. 8, the robot 10 is shown on a floor surface F, and the drive wheel 71 is being compressed into the housing 12, as indicated by arrow B, and is therefore not in the maximum extension in-use position, but rather is being forced to the minimum extension in-use position against the force of the spring 78. Alternatively, the spring 78 can be a tension spring biasing the drive wheel 71 upwardly, or clockwise about the pivot axis P with respect to the view shown in FIG. 8, toward the minimum extension in-use position.

The spring 78 can be coupled between the housing 12 and the drive wheel 71, or can be indirectly coupled to either, such as by having one end coupled to the wheel housing 76 rather than being directly coupled to the drive wheel 71 as shown in FIG. 8. The other end of the spring 78 is indirectly coupled to the housing 12 by being coupled to a linkage 79. The linkage 79 can be biased to press against the housing 12. In other embodiments, the linkage 79 can be fixed relative to the housing 12. The linkage 79 can include any element or elements suitable for coupling the spring 78 to the housing 12. In still another embodiment, the other end of the spring 78 can be indirectly coupled to the housing 12 by being coupled to a sensor on the housing 12, such as the lift-up sensor 106 (FIG. 2).

The robot 10 can include a wheel release 58 selectively releasing the wheel assembly 75 from operational engagement with the housing 12. In one embodiment, the wheel release 58 comprises a latch assembly 60. The wheel assembly 75 can be selectively engaged with the housing 12, i.e. retained in the engaged or in-use position, by the latch assembly 60. Releasing the latch assembly 60 allows the drive wheel assembly 75 to swing out of the underside 21 of the housing 12 to the disengaged or maintenance position for access to the wheel assembly 75 for servicing, including cleaning of the wheel assembly 75 or removal of the drive wheel 71 for more detailed cleaning or disentanglement of hair. Other configurations for the wheel release 58 are possible, including other latches, catches, or other mechanical fasteners that can operationally engage the wheel assembly 75 with the housing 12 for a cleaning operation, while allowing for the regular release of the wheel assembly 75 from the housing 12.

The latch assembly 60 can include a latch 61 and a spring 62 that biases the latch 61 into a position where at least a portion of the latch 61 overlaps a portion of the wheel assembly 75. The latch assembly 60 can further include a user-engageable portion 63, such as a button, knob, slider, or simply a surface of the latch 61 that the user can touch or grip, which can be physically engaged to move the latch 61 out of overlap with the portion of the wheel assembly 75.

In other embodiments, the wheel assembly 75 can be selectively engaged with the housing 12, i.e. retained in the engaged or in-use position, using other suitable mechanisms, including any suitable latch, catch, or other mechanical fastener that can retain the wheel assembly 75 in the engaged or in-use position, while allowing for the regular disengagement of the wheel assembly 75 from the housing 12.

In the embodiment shown, the portion of the wheel assembly 75 selectively overlapped by the latch 61 comprises a detent or stop 64. The detent or stop 64 limits the extension of the drive wheel assembly 75 during normal operation of the robot 10. The stop 64 is located such that when the drive wheel 71 pivots to the maximum extension in-use position, the stop 64 contacts the latch 61 and prevents the drive wheel 71 from rotating past the maximum extension in-use position. As shown in the embodiment of FIG. 8, the stop 64 can be provided on the wheel housing 76, but can alternatively be provided on the drive wheel 71 or elsewhere on the wheel assembly 75 such that it can limit extension.

Figure 9:
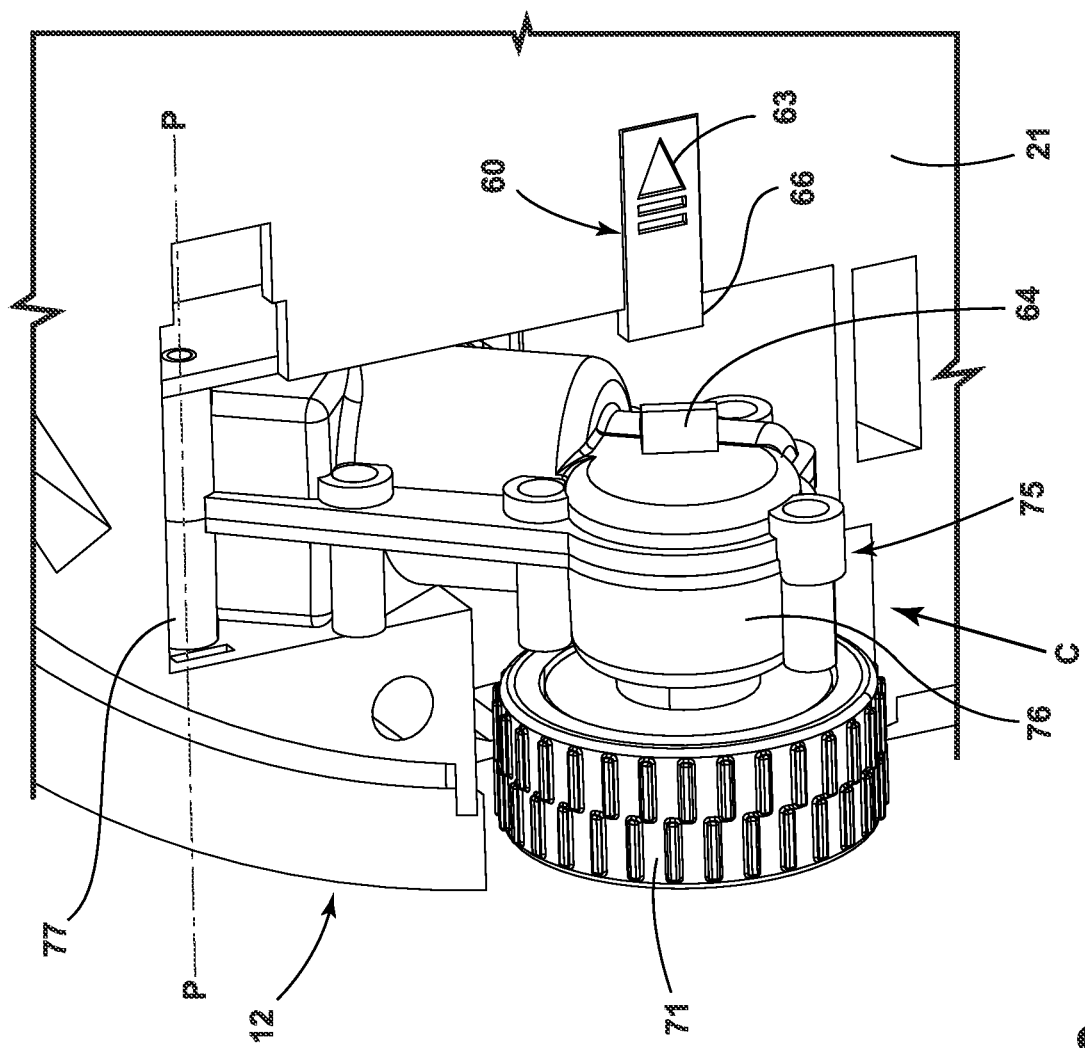
FIG. 9 is an isometric view of the underside of the floor cleaning robot of FIG. 3, showing the operation to move the wheel assembly from the extended or maintenance position to the in-use position.

Referring to FIGS. 8-9, to reengage the wheel assembly 75 with the housing 12, i.e. move the wheel assembly 75 from the disengaged or maintenance position to the engaged or in-use position, a user can press the wheel assembly 75 upwardly as indicated by arrow C in FIG. 9. The stop 64 can include a wedge-shaped cam surface 65 that is in operable engagement with a latching end 66 on the latch 61. As the wheel assembly 75 is pressed upwardly, the cam surface 65 is configured to ride against the latching end 66, which is optionally wedge-shaped or ramped, and force the latch 61 back, against the bias of the spring 62. Once the stop 64 clears the latching end 66, the latch 61 can move back into a position where at least a portion of the latch 61 overlaps the stop 64, and the wheel assembly 75 is retained in the engaged or in-use position.

It is noted that in the disengaged or maintenance position, the wheel assembly 75 can remain attached to the housing 12. For example, the wheel assembly 75 can be attached at the pivot coupling 77 to the housing 12 in the disengaged or maintenance position. In other embodiments of the wheel assembly 75, the wheel assembly 75 may be fully detachable from the housing 12 in the disengaged or maintenance position.

Figure 10:
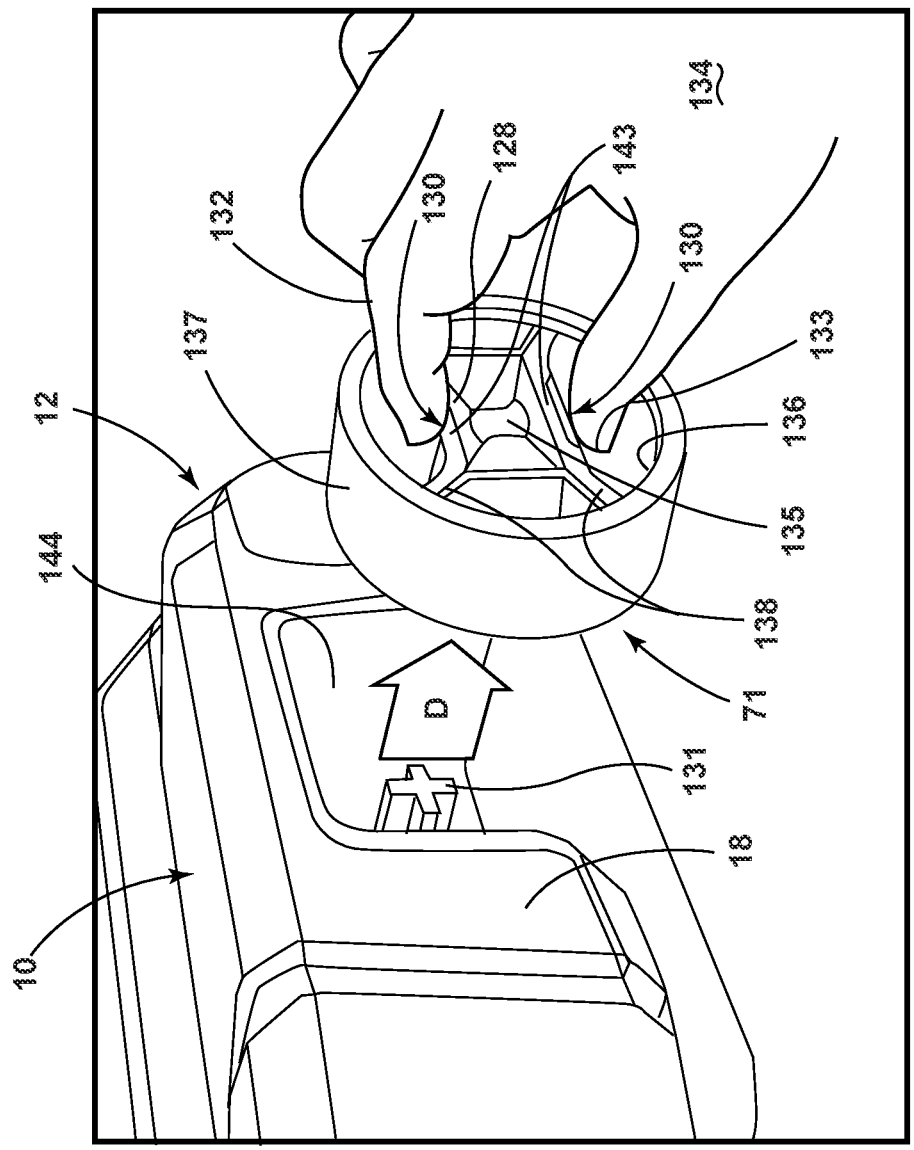
FIG. 10 is a schematic illustration of an embodiment of a removable drive wheel that can be utilized in the floor cleaning robot of FIG. 3, showing the removal of the drive wheel from a housing of the robot.

FIG. 10 is a schematic illustration of another embodiment of a drive wheel 71 that can be utilized in the robot 10. The robot 10 illustrated in FIG. 10 can include the various functions and systems as described in FIGS. 1-9, and like parts will be identified with like numerals. One difference is that the robot 10 can include a drive wheel 71 comprising a manual wheel release 128, such as pinch tabs 130, for manual and complete removal of the drive wheel 71 from the housing 12 for maintenance of the robot 10 and drive wheel 71. A user can manually engage the wheel release 128 to remove the drive wheel 71 from operational engagement with the wheel motor 72 (FIG. 1). When operationally engaged with the wheel motor 72, the drive wheel 71 can be coupled with an axle 131 coupled with the wheel motor 72 (FIG. 1) or with a transmission coupled with the drive motor 72. In the case of the pinch tabs 130, the user can pinch or squeeze the pinch tabs 130 together to remove the drive wheel 71 from the axle 131. For example, a user can pinch the pinch tabs 130 using a finger 132 and thumb 133 of one hand 134, as shown in FIG. 10, and, while still pinching, slide the drive wheel 71 off the axle 131 in the direction of arrow D. Other configurations for the manual wheel release 128 are possible, including latches, catches, or other mechanical fasteners that can join the drive wheel 71 and axle 131, while allowing for the regular separation of the drive wheel 71 from the axle 131.

The drive wheel 71 can comprise a center part or hub 135, and an outer rim 136 that holds a tire 137. The outer surface of the tire 137 can comprise a tread and/or be formed from a material providing traction. Spokes 138 can extend from the hub 135 to the rim 136. The number, distribution, and shape of the spokes 138 can vary, and in some embodiments, the drive wheel 71 can lack any spokes. Some additional hubs for the drive wheel 71 with varying spoke patterns are shown in FIGS. 14-16.

The manual wheel release 128 is provided on the hub 135, inboard of the tire 137, so a user can remove the drive wheel 71 without having to touch the dirty tire 137 of the drive wheel 71. As used herein with respect to the drive wheel 71. "inboard" refers to a direction radially inward of the tire 137. For example, the pinch tabs 130 can be placed on the hub 135 or spokes 138 of the drive wheel 71, so a user does not have to touch the dirty tire 137 to remove the drive wheel 71.

Figure 11:
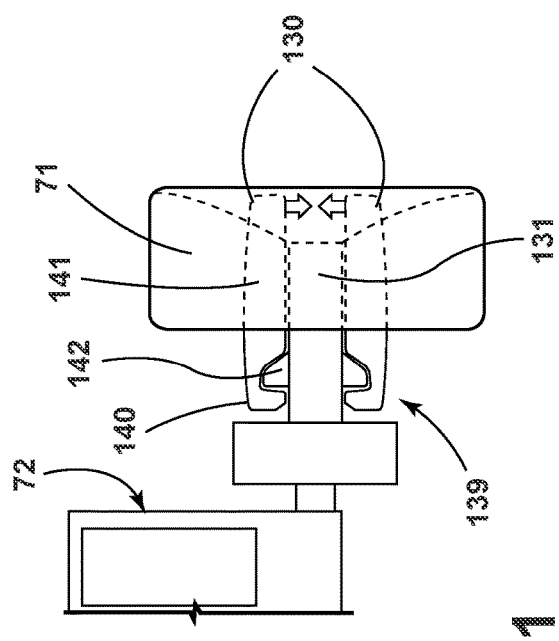
FIGS. 11-13 are cross-sectional illustrations of the removable drive wheel of FIG. 10, showing the steps for removing the drive wheel.
Figure 13:
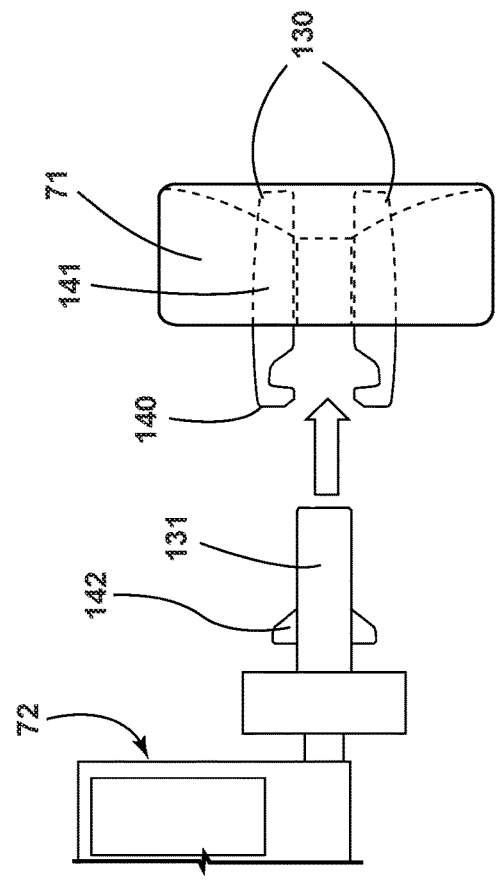
Figure 12:
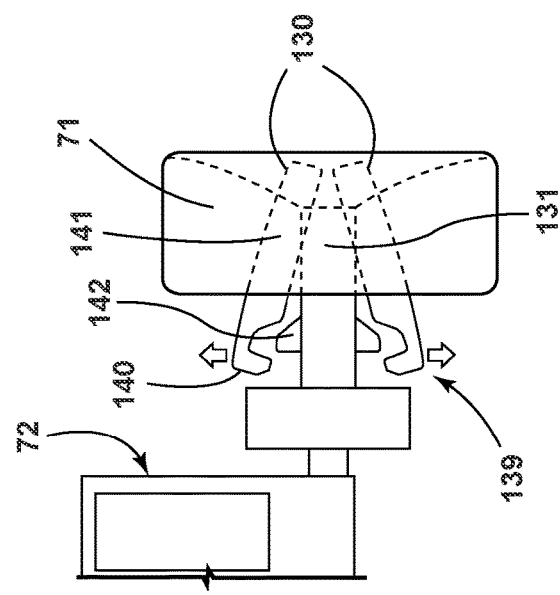

Optionally, the hub 135 can have a friction fit with the axle 131, and the user can grip the drive wheel 71 at the pinch tabs 130 to pull the drive wheel 71 off the axle. Alternatively, with reference to FIGS. 11-13, the pinch tabs 130 can be operably coupled with a mechanical latch 139 interfacing between the axle 131 and drive wheel 71. The mechanical latch 139 can include latching ends 140 coupled to one of the pinch tabs 130 by a living hinge 141 or another suitable structure. The latching ends 140 selectively engage catches 142 on the axle 131 to secure the drive wheel 71 on the axle 131. To remove the drive wheel 71, the pinch tabs 130 can be squeezed together as indicated in FIG. 11, which rotates the living hinges 141 and lifts the latching ends 140 away from the axle catches 142 as shown in FIG. 12 to disengage the mechanical latch 139. The user is then free to pull the drive wheel 71 off the axle as shown in FIG. 13.

The pinch tabs 130 can be integrated into the spoke pattern of the hub 135. As shown in FIG. 10, two opposing pinch tabs 130 can be provided on the hub 135, each lying between two adjacent spokes 138. The hub 135 can include flat portions 143 on which the pinch tabs 130 are provided to allow adequate space for the user's finger 132 and thumb 133. FIGS. 14-16 show some other exemplary spoke patterns and pinch tabs locations.

FIG. 10 shows the drive wheel 70 being removed from the lateral side 18 of housing 12. In particular, the housing 12 can comprise a wheelhouse or wheel well 144, and the wheel well 144 can be open to the lateral side 18 of the housing 12 so that the drive wheel 70 can be removed out of the wheel well 144 in the direction of arrow D. The direction of wheel removal can be generally orthogonal to the direction of forward motion indicated by arrow 17 (FIG. 4) and/or generally orthogonal to the lateral side 18 of the housing 12. Having the drive wheel 71 be removable from the lateral side 18 of housing 12 provides a benefit for charging or docking the robot 10 because the drive wheel 71 can be removed when the robot 10 is seated in the charging cradle or docking station.

In another embodiment, the removable drive wheel 71 with pinch tabs 130 can be incorporated with the drive wheel assembly 75 of FIGS. 5-9, and the drive wheel 71 can be removed by first disengaging the wheel assembly 75 from the housing 12, i.e. moving the wheel assembly 75 to the disengaged or maintenance position, and then removing the drive wheel 71 from the axle 131 using the pinch tabs 130.

There are several advantages of the present disclosure arising from the various aspects or features of the apparatus, systems, and methods described herein. For example, aspects described above provide an autonomous cleaning robot with a drive wheel assembly that can be selectively moved out of its in-use or operational position so that the wheel assembly and drive wheel can be cleaned, removed or otherwise serviced. With a wet cleaning robot, gunk in the form of wet hair and dirt that builds up around the wheel assembly can more easily be removed.

Another advantage of aspects of the disclosure relates to the accessibility of the drive wheel. Embodiments disclosed herein provide the user with easy access to the wheel assembly and/or drive wheel, only when appropriate, yet allows the wheel assembly and/or drive wheel to be hidden inside the unit during operation for aesthetic reasons.

Yet another advantage of aspects of the disclosure is that the drive wheel assembly can be selectively rotated beyond its in-use maximum extension position to swing out of the robot housing for full access to the drive wheel for servicing, including cleaning of the wheel assembly or removal of the drive wheel for more detailed cleaning or disentanglement of hair.

Still another advantage of aspects of the disclosure is that the drive wheel can be removed from the housing when the robot is seated in a charging cradle or docking station.

To the extent not already described, the different features and structures of the various embodiments of the invention, may be used in combination with each other as desired, or may be used separately. That one autonomous floor cleaner or floor cleaning robot is illustrated herein as having all of these features does not mean that all of these features must be used in combination, but rather done so here for brevity of description. Thus, the various features of the different embodiments may be mixed and matched in various cleaning apparatus configurations as desired to form new embodiments, whether or not the new embodiments are expressly described.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular components or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

What is claimed is:

1. An autonomous floor cleaner, comprising:
an autonomously moveable housing;
a controller configured to control operation of the autonomous floor cleaner; and
a drive system carried by the autonomously moveable housing and configured to autonomously move the autonomously moveable housing over the surface to be cleaned based on inputs from the controller, the drive system comprising:
a wheel assembly pivotally coupled to the autonomously moveable housing for rotation about a pivot axis, the wheel assembly comprising a drive wheel and a wheel motor configured to drive the drive wheel about a rotational axis, wherein the wheel assembly is pivotable within a range of in-use positions, including at a maximum extension in-use position in which the drive wheel is fully extended from the autonomously moveable housing; and
a wheel release selectively releasing the wheel assembly from operational engagement with the autonomously moveable housing, wherein when released from the operational engagement with the autonomously moveable housing, the drive wheel is pivotable to a disengaged position that is farther from the autonomously moveable housing than the maximum extension in-use position.

2. The autonomous floor cleaner of claim 1, wherein the wheel assembly comprises a drive wheel housing, and the drive wheel is coupled to the drive wheel housing.

3. The autonomous floor cleaner of claim 2, wherein the drive wheel housing is rotatably coupled to the autonomously moveable housing.

4. The autonomous floor cleaner of claim 1, wherein the autonomously moveable housing comprises an underside facing the surface to be cleaned, and the wheel assembly pivots outward from the underside of the autonomously moveable housing to move from the maximum extension in-use position to the disengaged position.

5. The autonomous floor cleaner of claim 4, wherein the wheel release is on the underside of the autonomously moveable housing.

6. The autonomous floor cleaner of claim 1, comprising a spring biasing the drive wheel to one of the in-use positions.

7. The autonomous floor cleaner of claim 6, wherein the spring is a compression spring biasing the drive wheel toward the maximum extension in-use position.

8. The autonomous floor cleaner of claim 6, comprising a linkage coupled with the autonomously moveable housing, wherein one end of the spring is coupled with the linkage and another end of the spring is coupled with one of the drive wheel and a drive wheel housing to which the drive wheel is coupled.

9. The autonomous floor cleaner of claim 1, wherein the wheel release comprises a latch assembly selectively retaining the wheel assembly in the operational engagement with the autonomously moveable housing.

10. The autonomous floor cleaner of claim 9, wherein the latch assembly comprises a latch and a spring biasing the latch into a position where at the latch overlaps a portion of the wheel assembly.

11. The autonomous floor cleaner of claim 10, wherein the latch assembly comprises a user-engageable portion configured to be manually engaged by a user to move the latch out of overlap with the portion of the wheel assembly.

12. The autonomous floor cleaner of claim 11, wherein the autonomously moveable housing comprises an underside facing the surface to be cleaned, and the user-engageable portion is on the underside of the autonomously moveable housing.

13. The autonomous floor cleaner of claim 10, wherein the portion of the wheel assembly selectively overlapped by the latch comprises a stop configured to prevent the drive wheel from rotating past the maximum extension in-use position.

14. The autonomous floor cleaner of claim 13, wherein the stop comprises a wedge-shaped cam surface in operable engagement with a latching end on the latch.

15. The autonomous floor cleaner of claim 1, wherein the wheel assembly remains pivotally attached to the autonomously moveable housing in the disengaged position.

16. The autonomous floor cleaner of claim 1, comprising a vacuum collection system comprising a recovery pathway through the autonomously moveable housing having an air inlet and an air outlet, a debris receptacle, and a suction source in fluid communication with the air inlet and the debris receptacle.

17. The autonomous floor cleaner of claim 1, comprising a fluid delivery system, the fluid delivery system comprising a supply tank, at least one fluid distributor in fluid communication with the supply tank, and a fluid delivery pump configured to control a flow of cleaning fluid to the at least one fluid distributor.

* * * * *